Aug. 5, 1958 E. LUCHTERHAND 2,846,017
SNOW VEHICLE WITH ENDLESS TREAD PROPELLING DEVICE
Filed March 9, 1954 3 Sheets-Sheet 1
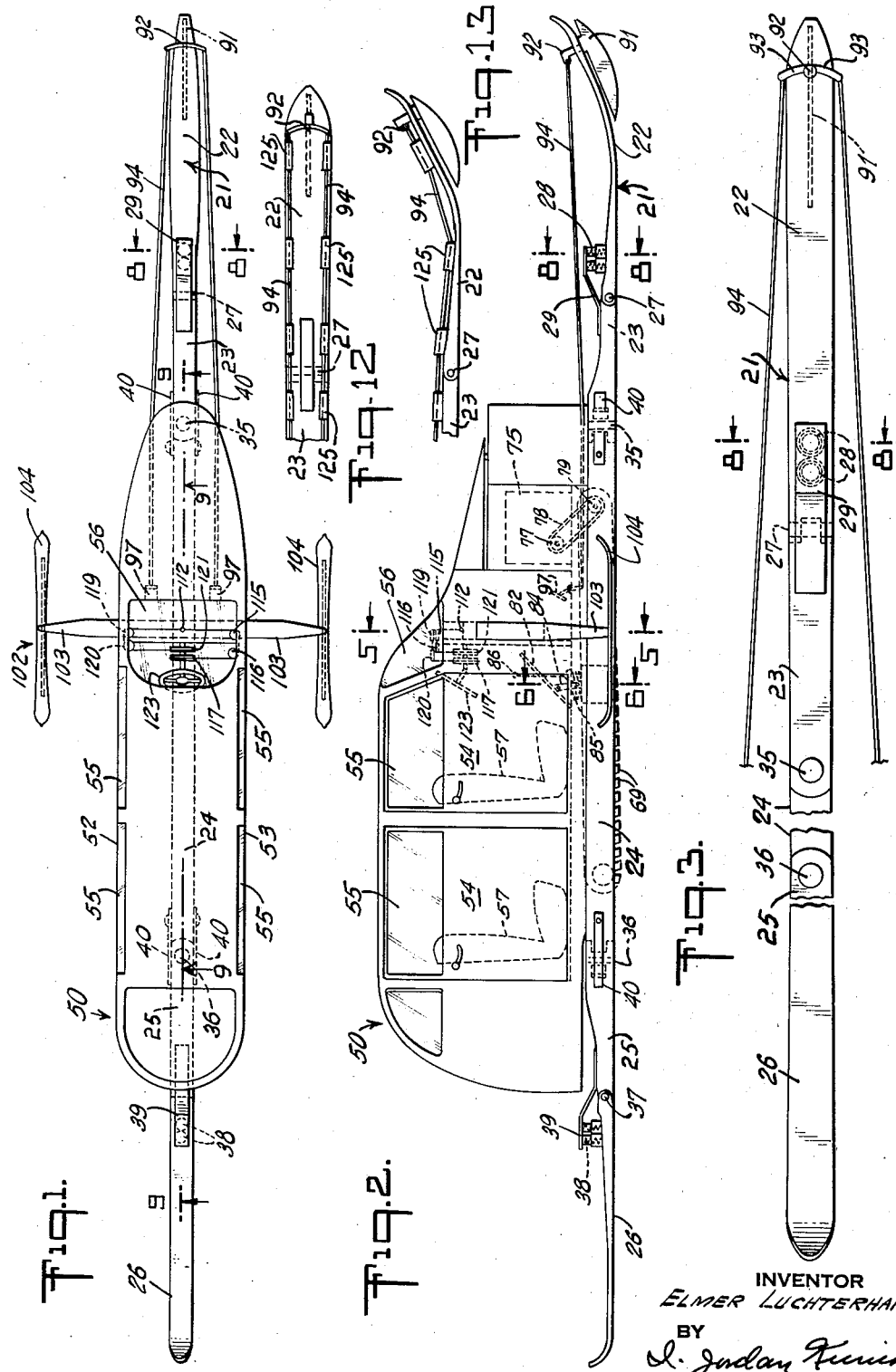
INVENTOR
ELMER LUCHTERHAND
BY
ATTORNEY Aug. 5, 1958 — E. LUCHTERHAND — 2,846,017
SNOW VEHICLE WITH ENDLESS TREAD PROPELLING DEVICE
Filed March 9, 1954 — 3 Sheets-Sheet 2
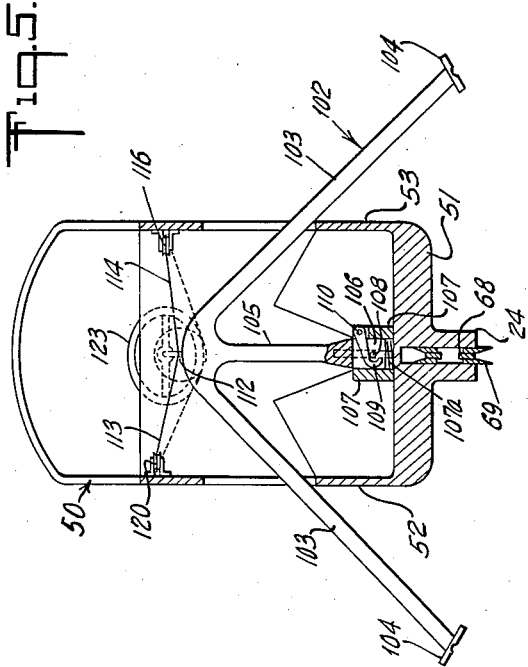
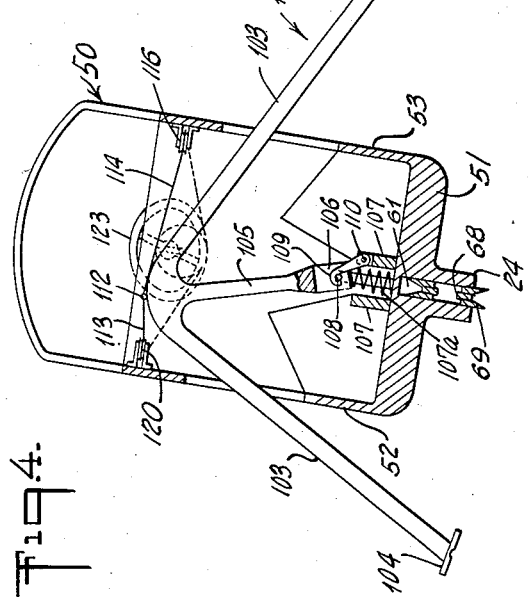
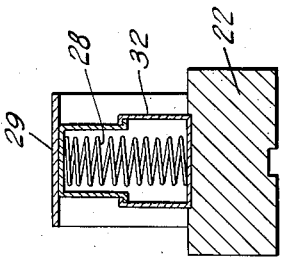
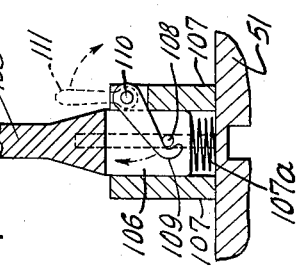
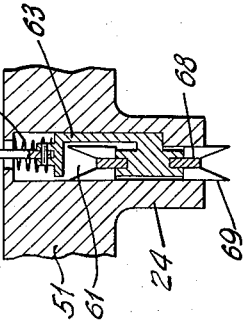
INVENTOR
ELMER LUCHTERHAND.
BY
J. Jordan Kunik
ATTORNEY Aug. 5, 1958  E. LUCHTERHAND  2,846,017
SNOW VEHICLE WITH ENDLESS TREAD PROPELLING DEVICE
Filed March 9, 1954  3 Sheets-Sheet 3

INVENTOR
ELMER LUCHTERHAND
BY
I. Jordan Kunik
ATTORNEY

United States Patent Office 2,846,017
Patented Aug. 5, 1958

2,846,017

SNOW VEHICLE WITH ENDLESS TREAD PROPELLING DEVICE

Elmer Luchterhand, Westmount, Quebec, Canada

Application March 9, 1954, Serial No. 415,131

14 Claims. (Cl. 180—5)

This inveniton relates to snow vehicles, and more particularly to a snow vehicle embodying novel structural and propulsion features.

The purpose of this invention is to provide fast, economical, motorized snow transportation for general travelling purposes as well as for prospecting, mining, mail carrying, surveying, rescue work, and the like.

The snow vehicle of the present invention comprises a novel articulated compound runner having multiple sections which are adapted to traverse uneven terrain, and at the same time to maintain stability of motion thereof for a cabin mounted on at least one of the sections of said runner.

There is also provided a novel propulsion means which is integrated with at least one of the portions of the runner, and which comprises an endless tread propulsion chain mounted within a longitudinal slot of the runner and which is adapted to frictionally engage the terrain and propel the vehicle, motor power being provided by an engine mounted in the cabin or on the runner.

The endless tread drive is adapted to be retracted within the runner at times when it is desired to have the vehicle glide freely.

Novel steering means are also provided which are operable from within the cabin.

Additionally, there is also provided a pair of auxiliary ski runners which extend on each side of the compound runner and which serve to stabilize the vehicle while it is at rest or in slow movement or while it is being used by an inexperienced operator.

Still other objects and advantages of my invention will be apparent from the specification.

The features of novelty which I believe to be characteristic of my invention are set forth herein and will best be understood, both as to their fundamental principles and as to their particular embodiments, by reference to the specification and accompanying drawings, in which:

Figure 1 is a top plan view, partly in phantom outline, of the snow vehicle of the present invention;

Fig. 2 is a side elevation, partly in phantom outline, of the vehicle shown in Fig. 1;

Fig. 3 is a plan view, greatly enlarged, partly broken away and partly in phantom outline, showing the novel structural features of the runner;

Figs. 4 and 5 are views taken on line 5—5 of Fig. 2;

Fig. 6 is a view taken on line 6—6 of Fig. 2;

Fig. 7 is a view taken on line 7—7 of Fig. 9;

Fig. 8 is a greatly enlarged view taken on line 8—8 of Figs. 1, 2 and 3;

Fig. 12 is a fragmentary view in plane of the forward portion of a runner illustrating a modification of the invention. Fig. 13 is a side elevational view of the runner shown in Fig. 12.

Figure 9:
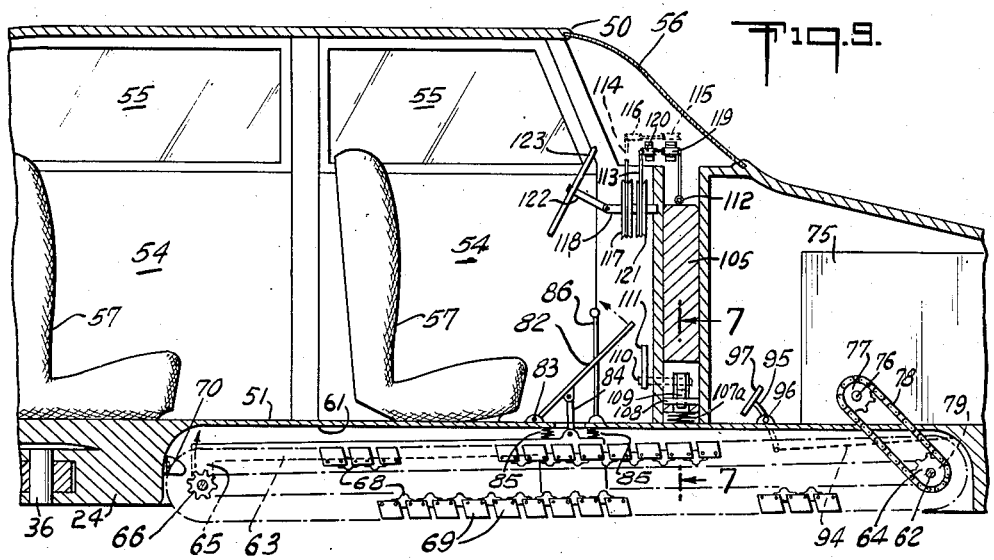
Fig. 9 is a greatly enlarged view of a portion of Fig. 2, partly in section taken along the line 9—9 of Fig. 1 and partly cut away to show the various control mechanisms and the propulsion mechanisms.
Figure 10:
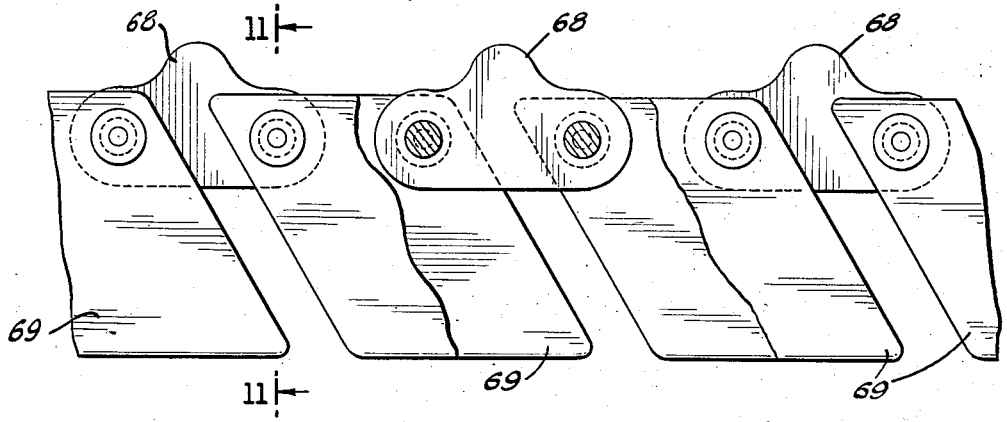
Fig. 10 is a still further enlarged view of the several sections of the propulsion chain.

Referring now to the drawings in detail, and particularly to Figs. 1 and 2, the snow vehicle of the present invention comprises a compound runner generally designated 21, having five sections articulated into a longitudinal ski-like blade, having a form and shape similar to the well known foot skis.

These sections comprise a front section 22, front intermediate section 23, a central section 24, a rear intermediate section 25, and a tail section 26. The forward part of the front section 22 is widened to some extent, and the rear part of the tail section 26 is widened, but to a lesser extent, in order to facilitate turning while the vehicle banks for a turn. Front section 22 is pivotally connected to intermediate section 23, and is pivotable upwards and downwards only on horizontal pivot pin 27.

This pivoting function is provided for in order to permit the vehicle to glide over uneven terrain. In order, however, to maintain front section 22 in contact with the terrain, said section 22 is biased downward by means of spring 28 (see also Fig. 8), one end of which abuts the underside of an upwardly and forwardly extending steel bracket 29, the rear end of which is securely attached to intermediate section 23. Spring 28 is enclosed in a frame 32 to protect it from the elements, if desired, as shown in Fig. 8.

Intermediate section 23 is connected to central section 24 by means of vertical pivot pin 35 which permits the side-to-side or lateral movement of sections 22 and 23 as a unit for steering purposes.

It will be noted that rearward intermediate section 25 is connected to central section 24 in a manner similar to that of the connection between section 23 and section 24 by vertical pivot pin 36. Also, rear section 26 is pivotably connected to section 25 by means of horizontal pivot pin 37, similarly to the connection between sections 22 and 23. Spring 38 and bracket 39 are provided, similar to spring 28 and bracket 29 in order to bias tail section 26 downwards upon the terrain that is being traversed.

Runner sections 23 and 25 may be maintained normally in a straight line with central runner section 24 by means of pairs of strong spring plates 40 mounted upon the sides of both ends of section 24 and whose free slightly yieldable ends extend some distance past pins 35 and 36 respectively. These plates, which are optional, will obviate the possibility of the forward and rearward runner sections from making too sharp an angle with the central runner section. In some embodiments, plates 40 may be mounted only upon the forward end of central section 24 to prevent jackknifing. Other suitable mechanical means may be utilized to prevent jackknifing at pins 35 and 36.

Mounted on the central runner section 24 is a cabin, generally designated 50. Section 24 and cabin 50 may be attached to each other by any suitable means, but in the embodiment shown, particularly as seen in the section drawings of Figs. 4 and 5, runner section 24 comprises a downwardly extending flange from the floor 51 of the cabin, thereby forming a sturdy and unitary structure. The cabin also comprises walls 52 and 53, into which are set doors 54 having openings or windows 55. The upper front part of the cabin has a suitable windshield 56, while inside the cabin there are arranged suitable seats 57 for passengers.

Figure 11:
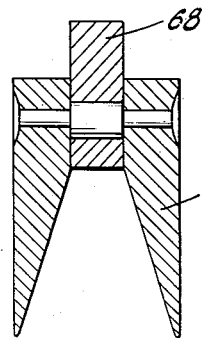
Fig. 11 is a section taken on line 11—11 of Fig. 10.

Propulsion for the machine is provided by a novel endless tread drive which is mounted in longitudinal slot 61 within central runner section 24. Referring particularly to Fig. 9, there is shown a horizontal pin 62 in the forward end of slot 61 upon which is pivotally mounted a longitudinal frame 63 that extends rearwardly through slot 61. Mounted on pivot pin 62 is a drive sprocket 64. The rearward end of frame 63 has a downwardly extending leg 65 upon which is mounted an idler sprocket 66. Mounted around sprockets 64 and 66 is an endless chain comprising links 68 that interconnect lateral pairs of teeth 69, whose sides taper out to form comparatively thin edges, as shown in Fig. 11.

During operation of the vehicle, much of its loaded weight rests on the long, narrow, endless tread propulsion drive. The lateral pairs of teeth 69 with their connecting links 68 are designed so that, when the power is applied and the tread is in more or less rapid motion, the snow is tightly compressed between the tapered inner surfaces of the teeth, with some snow forced into the narrow space between the trailing edges of one pair of teeth and the leading edges of the next pair. The propulsion tread, when set in motion, imparts a downward and rearward thrust on the continuous ridge of tightly compressed snow formed by the moving pairs of tapered teeth. In traversing icy surfaces the comparatively thin outer edges of the teeth cut into and frictionally engage the ground surface.

It will be noted that leading and trailing edges of teeth 69 are slanted in a forward direction in order to reduce the possibility of clogging with snow and debris as the endless tread moves. There is provided in the rear of slot 61 a stationary hook 70 that projects into the space between the pairs of teeth 69 in order to clear the teeth of snow and debris.

Power for driving the endless tread is derived from a motor 75 mounted in the forwardly projecting end of cabin 50. Upon the output shaft 76 of motor 75 is mounted a sprocket 77 which drives a link chain 78 which drives sprocket 79 which in turn drives sprocket 64 to engage the links 68 of the endless tread. As shown in Figs. 2 and 9, the endless tread is shown in an operating propelling position.

The endless propulsion tread is adapted to be retracted within the runner at times when it is desired to have the vehicle glide freely, or when it is to be towed or moved by hand. Retraction is accomplished by means of a manually operated mechanism within reach of the driver of the vehicle. This manual control comprises a lever 82 which is pivotally connected to the floor of the cabin at point 83. Connected between lever 82 and frame 63 is a link 84. Pulling the lever 82 in the direction of the arrow shown in Fig. 9 will cause frame 63 to rise pivotally on pin 62, thereby withdrawing the endless tread teeth above the lower extremity of runner section 24, thereby permitting the vehicle to move freely.

A pair of springs 85 are mounted between the upper part of slot 61 and the bar 63, said springs normally urging said bar downward pivotally so that the endless tread drive is normally in the operative position to propel the vehicle forward.

A lever 86 is provided to serve as a means for engaging or disengaging the sprocket 77 from drive shaft 76 by suitable linkage and clutch means (not shown).

The steering mechanism of the snow vehicle comprises a steering blade 91 having a crescent-like shape which is normally extended in a longitudinal direction relative to the longitudinal dimension of compound runner 21. Steering blade 91 has a shaft 92 that extends through the forward upturned portion of blade section 22, steering blade 91 being rotatable with said shaft. On the upper end of shaft 92 are a pair of laterally extending bracket arms 93. Attached to the end of each bracket arm 93 are cables 94 which extend rearwardly through a suitable aperture in the forward end of cabin 50, and whose rearward ends are attached to the lower end of levers 95. (See Figs. 3 and 9.) Levers 95 are pivotally mounted on pins 96, and the upper ends of levers 95 are provided with foot pedals 97. These foot pedals 97 accommodate the feet of the driver of the vehicle, who may steer the vehicle either to the right or left by pressing on the right or left pedals 97, respectively, thereby rotating steering blade 91 by means of shaft 92.

In some embodiments (see Figs. 12 and 13) retaining lips 125 may be provided on the top of runner sections 22 and 23 to serve as guides through which cable 94 may be laced so that no slack will develop in said cables should there be any upward movement of front section 22.

Stabilizing means for the snow vehicle described herein are provided by an inverted V-shaped frame, generally designated 102, having a pair of arms 103 at the extremities of which are attached a pair of short ski runners 104. See Figs. 1, 2, 4 and 5. Frame 102 is mounted vertically within cabin 50 so that the runners extend to the side and downward of cabin 50 and permit the vehicle to stand substantially upright when it is at rest and not in use, as shown in Fig. 5.

When the vehicle is not in use and it is desired to have it stand upright, frame 102 is in the lowered position as shown in Fig. 5 with ski runners 104 resting on the snow. Frame 102 has a central leg 105 extending downward from the apex of the V substantially in the same plane as legs 103. The lower end of leg 105 has a flat portion 106 that is adapted to slide into a frame comprising walls 107. Positioned captive between walls 107 is a coiled spring 107a which normally urges leg 106 upward and outward from the frame. When it is desired to secure frame 102 in the position shown in Fig. 5, a pin 108 near the lower end of leg 106 is engaged by a hook 109 which locks leg 106 in the lowered position as shown in Figs. 5 and 7. Hook 109 is rotated on pin 110 by means of handle 111 whereby frame 102 is permitted to rise by the action of spring 107a.

The upward motion of frame 102 is limited, however, by the curved end of hook 109 which always encircles pin 108, as shown in Fig. 4. The purpose of raising frame 102 when the vehicle is in motion is to permit banking on turns, as shown in Fig. 4. If the vehicle is taking a right turn and banks to the right, the right hand ski runner 104 is raised so as not to interfere with such a banking turn.

In order to move frame 102 from side to side, frame 102 is provided with stud 112 at its apex, to which are tied cables 113 and 114.

Cable 114 extends around pulleys 115 and 116 mounted on suitable brackets on the wall of the cabin, and is connected to pulley 117 mounted on the substantially horizontal shaft 118. Cable 113 extends around pulleys 119 and 120 and is connected on pulley 121 also mounted on shaft 118. Connected by a suitable universal joint to shaft 118 is a steering column 122 on the end of which is mounted a steering wheel 123. The rotation of wheel 123 in one direction or the other by the operator of the vehicle will cause frame 102 to move pivotally to one side or the other as desired.

The bottoms of the various sections of the runners are provided with longitudinal slots which are coextensive with each other and which perform the function of stabilizing the forward motion of the vehicle.

In the specification, I have explained the principles of my invention, and the best mode in which I have contemplated applying those principles, so as to distinguish my invention from other inventions; and I have particularly pointed out and distinctly claimed the part, mode or combination which I claim as my invention or discovery.

While I have shown and described certain perferred embodiments of my invention, it will be understood that modifications and changes may be made without departing from the function and scope thereof, as will be clear to those skilled in the art.

I claim:

1. A snow vehicle comprising a compound runner having a central section, a forward section and a rearward section, said forward and rearward sections being pivoted about transverse horizontal axes to adjacent ends of said central section for pivotal movement upward and downward on said central section, means connected between said central section and said forward and rearward sections to bias said forward and rearward sections downwardly, a longitudinal slot in the bottom of said central section, endless tread drive means mounted within said longitudinal slot for propelling said vehicle, a cabin mounted on said central section, engine drive means in said cabin drivingly connected to said endless tread drive and an endless tread operably mounted about said endless tread drive.

2. A compound runner for snow vehicles comprising a forward section, a forward intermediate section, a central section, a rearward intermediate section and a rearward section, said forward section being pivoted about a horizontal transverse axis to said forward intermediate section for pivotal movement upward and downward relative to said forward intermediate section, said forward intermediate section being pivoted about a vertical axis to one end of said central section for lateral pivotal movement relative to said central section, said rearward intermediate section being pivoted about a vertical axis to the other end of said central section for lateral pivotal movement relative to said central section, and said rearward section being pivoted about a horizontal transverse axis to said rearward intermediate section for pivotal movement upward and downward relative to said rearward intermediate section, means for biasing the forward and rearward sections downwardly with respect to the forward and rearward intermediate sections and further means for biasing the forward intermediate and rearward intermediate sections into alignment with the central section.

3. A snow vehicle comprising a compound runner, including a central section, a forward section pivoted about a horizontal transverse axis to the forward end of said central section and a rearward section pivoted about a horizontal transverse axis to the rearward end of said central section, means for biasing the forward and rearward sections downwardly with respect to the central section, a rigid frame comprising a pair of arms arranged in inverted V-formation, a central leg rigidly connected to the apex of said frame and projecting downwardly therefrom intermediate the arms of said frame, said central leg having its lower end pivotally connected about a longitudinally disposed horizontal axis to the central runner section for rotary movement of said frame about said last named axis remote from the apex of said frame, and a runner mounted on the free end of each of said frame arms, said runners being disposed on opposite sides of said central section and substantially parallel thereto.

4. A snow vehicle according to claim 3, and further comprising means operable for rotating said frame about said pivotal connection to the central runner section.

5. A vehicle according to claim 1, in which said endless tread comprises pairs of laterally spaced elongated teeth and links connecting each pair of teeth in the longitudinal direction of the tread and in spaced relation to adjacent pairs of teeth, each of a pair of teeth being pivoted about horizontal axes on opposite sides of two connecting links and having their inner surfaces tapering downwardly from said links to form thin runner-like edges and to define an elongated, wedge-shaped, snow receiving pocket therebetween.

6. A vehicle according to claim 5, and further comprising a hook disposed within the slot of said central runner section and projecting into said snow-receiving pocket.

7. A vehicle according to claim 5, in which the leading and trailing edges of said teeth are slanted forward in respect to said vehicle.

8. A snow vehicle comprising a compound runner having a central section, a forward section and a rearward section, said forward and rearward sections each being pivotally mounted at respective forward and rearward ends of said central section on horizontal transverse axes whereby said forward and rearward sections may move pivotally upward and downward with respect to the horizontal plane of said central section, spring means connected between said central section and said forward and rearward sections, said spring means including a bracket member having one end secured inwardly of the forward end of said central section to the upper surface thereof and having the other end overlying the upper surface of said forward section forwardly of said pivotal mounting to said central section with biasing means interposed therebetween and a second bracket member having one end secured inwardly of the rearward end of said central section to the upper surface thereof and having the other end of said second bracket overlying the upper surface of said rearward section rearwardly of said pivotal mounting to said central section with further biasing means interposed therebetween, said spring means biasing said forward and rearward sections downwardly about their pivotal axes, said forward section being turned upward at its front extremity, a shaft mounted through said upturned portion, a runner steering blade mounted on said shaft on the underside of said upturned portion with the edge of said blade projecting outwardly from said portion, the lowest extremity of said outwardly projecting edge lying in substantially the bottom plane of the runner, and further means connected to said shaft to rotate said steering blade.

9. A snow vehicle as set forth in claim 8, in which said first biasing means comprises at least one compression spring mounted on said forward runner section and engaging the under side of the overlying end of said first mentioned bracket, and said further biasing means comprises at least one other compression spring mounted on said rearward runner section and engaging the under side of the overlying end of said second bracket.

10. A runner according to claim 2, wherein said means for biasing the forward section downwardly comprises a bracket secured at one end to one of said forward intermediate and forward sections, the other end of said bracket being provided with a spring overlying and exerting resilient pressure on the other of said forward intermediate and forward sections to yieldingly resist said upward movement of said forward section about its horizontal transverse pivotal axis.

11. A runner according to claim 10, wherein said means for biasing the rearward section downwardly comprises a second bracket secured at one end to one of said rearward intermediate and rearward sections, the other end of said second bracket being provided with a spring overlying and exerting resilient pressure on the other of said rearward intermediate and rearward sections to yieldingly resist said upward movement of said rearward section about its horizontal transverse pivotal axis.

12. A runner according to claim 2, wherein said means for biasing the forward intermediate and rearward intermediate sections comprise spring biasing plates mounted on opposite sides of said central section adjacent the pivotal mounting about said vertical axes of the forward and rearward intermediate sections to the central section and having substantial portions freely engaging the sides of said forward and rearward intermediate sections to resiliently resist said lateral pivotal movement of said intermediate sections relative to said central section.

13. A snow vehicle according to claim 3, wherein said pivotal connection of said central leg to said central runner section includes a horizontal pivot pin carried by the lower end of said central leg to provide for said rotary movement of said central frame, means carried by said central runner and engageable with said pivot pin and further means mounted on said central runner between the upper surface of said central runner and said lower end of the central leg, said last mentioned means being vertically adjustable for vertical movement of said rigid frame relative to said central runner to selective raised and lowered positions.

14. A snow vehicle as set forth in claim 13, in which said means carried by said central runner comprises an arm having one end pivotally mounted on said central runner to rotate about a horizontal axis, the other end of said arm having a bearing portion releasably engageable with said pin, said arm being rotated about its axis to selectively engage said pin when the frame is moved to one of its selected raised and lowered positions.

References Cited in the file of this patent

UNITED STATES PATENTS

| | | |
|---|---|---|
| 31,797 | Gibson | Mar. 26, 1861 |
| 619,327 | Miner | Feb. 14, 1899 |
| 1,084,187 | Wiberg | Jan. 13, 1914 |
| 1,682,051 | Pearson | Aug. 28, 1928 |
| 1,916,375 | Knickerbocker | July 4, 1933 |
| 2,116,834 | Kegresse | May 10, 1938 |
| 2,339,886 | Shannon | Jan. 25, 1944 |
| 2,367,528 | Rollins | Jan. 16, 1945 |
| 2,520,861 | Stone | Aug. 29, 1950 |
| 2,582,858 | Capiak | Jan. 15, 1952 |
| 2,618,516 | Smith | Nov. 18, 1952 |
| 2,683,608 | Matheson | July 13, 1954 |

FOREIGN PATENTS

| | | |
|---|---|---|
| 497,519 | Canada | Nov. 10, 1953 |

(Corresponding to U. S. No. 2,700,427, Jan. 25, 1955)

| | | |
|---|---|---|
| 46,263 | Switzerland | July 26, 1909 |
| 112,622 | Switzerland | Nov. 16, 1925 |
| 118,365 | Switzerland | Jan. 3, 1927 |
| 158,563 | Switzerland | Feb. 1, 1933 |